Patented Oct. 23, 1934

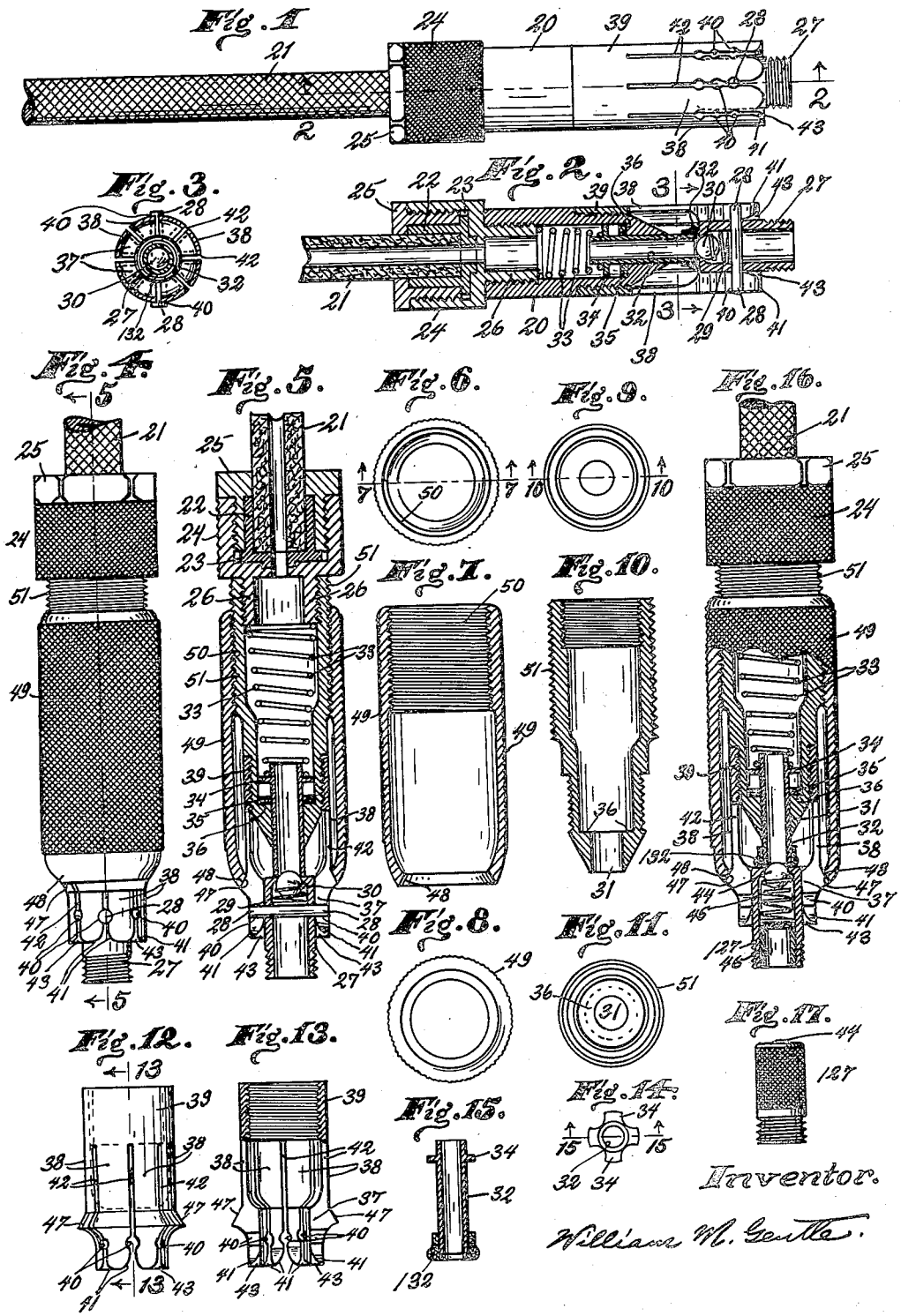

1,977,847

UNITED STATES PATENT OFFICE 1,977,847

ADAPTER

William M. Gentle, Los Angeles, Calif., assignor of one-half to Lawrence F. Searson, Chicago, Ill.

Application October 15, 1929, Serial No. 399,739

2 Claims. (Cl. 285—123)

This invention relates to means for making a detachable connection between a container having lubricant therein under pressure and the inlet end of a substantially cylindrical nipple so that the lubricant can be transferred in suitable quantities from the container to the nipple, and the principal object is to provide an adapter at the discharge end of the connection that can be easily and expeditiously attached to or removed from a nipple by simply moving it endwise to or from the nipple. To that end I provide an adapter having spring arms at its discharge end with clutch members arranged to grip the nipple when by a single movement the adapter is moved endwise toward it so as to hold the adapter on the nipple while the latter is being charged with lubricant, and the adapter is removed from the nipple by a single movement endwise from the nipple.

Another object of the invention is to provide an adapter with a simple and efficient means for detachably connecting it to the extended ends of a nipple cross pin. To that end I detachably secure spring arms at the discharge end of the adapter that are spaced a slight distance apart with a plurality of oppositely arranged notches in their adjacent edges that are adapted to receive the extended ends of the cross pin to aid in holding the adapter on nipples having cross pins or like projections while they are being charged with lubricant. The adapter is detached by simply pulling it endwise from the nipple until the notches of the spring arms are released from the extended ends of the cross pin.

Another object of the invention is to provide a simple manually operable means for forcing the clutch members of the spring arms into locked engagement with the body of a cylindrical nipple so that the adapter cannot be disengaged until the clutch members are released by the manually operable means.

A feature of invention is shown in the construction and arrangement of a hollow sleeve slidably mounted in the discharge end of the adapter that is arranged to engage the inlet end of a nipple when the adapter is attached and placed under the tension of a spring so as to form a tight connection between the ends of the sleeve and nipple to prevent the lubricant from escaping between the abutting ends when the lubricant is driven through the adapter into the nipple.

Features of invention are shown in the construction, combination and arrangement of parts whereby an adapter is provided that is easy to construct, assemble and operate, that is neat and pleasing in appearance and effective and durable in use.

Other objects, advantages and features of invention may appear from the accompanying drawing, the subjoined detailed description and the appended claims.

The accompanying drawing illustrates the invention.

Figure 1 is a perspective view of an adapter constructed in accordance with this invention showing it detachably secured to a nipple ready to charge it with lubricant; also showing a portion of the flexible hose by which the adapter is connected to a grease gun not shown, parts shown about actual size.

Fig. 2 is a central longitudinal section on the line 2—2, Fig. 1.

Fig. 3 is a cross section on line 3—3, Fig. 2, showing the spring arms and sliding sleeve in section and also showing the clutch members engaging the cylindrical nipple and the cross pin of the nipple extended into notches between the spring arms so as to aid in holding the adapter on the nipple while being charged with lubricant.

Fig. 4 is a view analogous to Fig. 1 showing the inlet end of the adapter body enlarged and externally threaded for a knurled handle that carries a chuck that is adapted to drive the clutch members into locked engagement with the cylindrical nipple.

Fig. 5 is a central longitudinal section on line 5—5, Fig. 4.

Fig. 6 is a view of the threaded end of the knurled handle detached from the adapter.

Fig. 7 is a section on line 7—7, Fig. 6, showing the detailed construction of the knurled handle and its chuck end.

Fig. 8 is an end view of the handle showing its chuck end.

Fig. 9 is an end view of the inlet end of the hollow body detached from the other parts of the adapter.

Fig. 10 is a central longitudinal section on line 10—10, Fig. 9, showing the detailed construction of the body.

Fig. 11 is an end view of the discharge end of the body.

Fig. 12 is a perspective view of the nipple clutching means detached from the body.

Fig. 13 is a section on the line 13, 13, Fig. 12, showing the detailed construction of the clutch body and its integral spring arms and clutch members.

Fig. 14 is an end view of the sliding sleeve removed from the body.

Fig. 15 is a section on line 15, 15, Fig. 14.

Fig. 16 is a view analogous to Fig. 4 shown with the lower part in section and also showing the adapter secured to a nipple without a cross pin.

Fig. 17 is a perspective view of the cylindrical nipple shown in Fig. 16 detached from the adapter.

The adapter includes a hollow body 20 that has its inlet end connected by a flexible hose 21 to a container in which lubricant is maintained under pressure or the hose can be connected to a grease gun. The container and grease gun are old in the art and for that reason are not shown in the drawing.

The discharge end of the hose 21 is connected to the body 20 by a swivel bearing 22 that is held in a socket 23 of a housing 24 by a plug nut 25, the housing being connected to the body by a threaded stem 26. The swivel connection of the hose to the adapter is to permit the latter to be turned on its axis so as to arrange it in a proper position to connect it to a nipple 27 or nipple 127 preferably the latter. The nipple 27 is provided with a cross pin having extended ends 28 and the center of the pin supports a spring 29 that normaly holds a ball check valve 30 in position to close the inlet passage to the nipple. Preferably the nipple 27 is cylindrical and formed without exterior projections, as shown in Figs. 16 and 17.

The discharge end of the body 20 is tapered and provided with a smooth center bore 31 in which the hollow sleeve 32 is slidingly fitted. This sleeve normally has its discharge end extended a considerable distance beyond the tapered end of the body by a spring 33 that has one end seated on a notched flange 34 integral with the sleeve and the other end engaged with the stem 26.

If desired the extended end of the sleeve 32 can be provided with a soft rubber tip 132 as shown in Figs. 15 and 16.

The spring 33 normally holds the flange 34 seated on a packing ring 35 seated on the shoulder 36 on the interior of the body, and the smooth tight sliding fit of the sleeve in the end bore of the body together with the packing ring prevents leakage of the lubricant from the adapter around the sleeve.

The sleeve 32 is arranged so that its extended end abuttingly engages the inlet end of the nipple 27 so as to form a tight connection between the parts so that lubricant under pressure can be discharged through the sleeve into the nipple without waste.

The adapter is detachably connected to a nipple by means of clutch members 37 that are integral with the free end of spring arms 38. These arms have their other ends integral with an arm carrier band 39 that is internally threaded so it can be secured to the body 20 adjacent its discharge end.

The arms 38 are spaced a slight distance apart and arranged parallel with the body, and on the adjacent edges of the arm I provide a plurality of registering notches 40 that are arranged to snap over the extended ends 28 of the cross pin and aid the clutch members in holding the adapter detachably secured to the nipple. The free ends of the arms are tapered from their edges toward their centers so as to form guides 41 for centering the slots or spaces 42 between the arms over the extended ends 28 of the cross pin; and also the clutch members 37 have their bottom ends tapered outwardly so as to form guides 43 to facilitate sliding the clutch members 37 onto the nipple.

The outer diameter of the nipple 127 is slightly greater than the distances between opposite clutch members 37 so that the latter are forced outwardly against the tension of the spring arms as the adapter is moved endwise onto the nipple so that they clutch the nipple with sufficient force to hold the adapter in place on the nipple without aid of the locking means while it is being charged with lubricant.

The foregoing description applies particularly to the adapter shown in Figs. 1, 2, 3 and 16, and is also descriptive of the adapter shown in Figs. 4 to 15 inclusive, except in the latter I have added cam surfaces to the clutch members and provided means for engaging the cam to force the clutch members into locked engagement with the nipple. The nipple 127 as shown in detail in Figs. 17 can have a smooth exterior cylindrical surface without indentations or projections, as the clutch members 37 when forced inwardly are adequate to hold the adapter on the nipple without the aid of extensions, pins, projections or indentations on or in the outer surface of the nipple.

In detail the nipple 127 includes a hollow cylindrical body having its inlet end closed by a ball check valve with its spring 45 supported on the end of an inner tube 46 that is secured in place by means well understood in the art. The exterior portion of the body is knurled so that the clutch members can more effectively grip it when the adapter is attached.

In the means for locking the clutches 37 to the cylindrical body of the nipple 27 or 127 I provide the clutch members with integral cams 47 that are adapted to be engaged by a chuck 48 that is integral with the end of the knurled handle 49 that has its other inner end portion 50 internally threaded to fit the external threaded portion 51 of the cylinder 20 so that when the handle is rotated on its longitudinal axis it will move the chuck 48 toward or from the cams. When the chuck 48 is actuated so as to engage the cams 47 and force the clutch members 37 toward one another to grip the cylindrical nipple sufficient force can be applied through the handle to lock the adapter on the nipple so it cannot be displaced until manually released by a reverse movement of the handle.

In operation the adapter is moved into a position in which it is axially aligned with a nipple and then forced endwise until the clutch members 37 engage and grip the body of the nipple to hold the adapter thereon while the nipple is charged with lubricant, after which the adapter is removed from the nipple by pulling it endwise in a reverse direction.

As the adapter is moved endwise to grip the nipple the discharge end of the sleeve 32 will contact with the inlet end of the nipple and by pressure of the spring 33 will be held tightly over the inlet to the nipple so that the lubricant can not escape between the sleeve and nipple while the latter is being filled. If desired the sleeve 32 can be provided with a soft rubber tip 132 that will aid in forming a tight abutting fit between the sleeve and nipple.

I claim as my invention:

1. In an adapter the combination, of a hollow cylinder having its inlet end connected to the discharge end of a hose through which lubricant is forced by pressure, a cylindrical nipple, a sleeve slidably mounted in the discharge end of said cylinder, a spring for normally holding said sleeve extended from said cylinder so it can be abuttingly engaged with the inlet end of said nipple so as to make a tight connection between the ends of said sleeve and nipple, a clutch carrier band secured to said cylinder, spring arms integral with said band, clutch members integral with the free ends of said arms arranged to engage the peripheral surface of said nipple, and a handle screw mounted on said cylinder for detachably holding said clutch members engaged with said nipple so as to hold said adapter in place while said nozzle is being charged with lubricant.

2. In an adapter for charging a nipple with lubricant, the combination with a nipple having a cross pin with the ends thereof extended therefrom, of a cylindrical body, a plurality of spring arms extended forward from said body, clutches integral with the forward ends of said arms, said arms spaced apart and having a plurality of oppositely arranged notches in adjacent edges thereof that are adapted to be forced over and into clutching engagement with the cross pins of said nipple.

WILLIAM M. GENTLE.